US012757881B2

(12) United States Patent
Stokes et al.

(10) Patent No.: US 12,757,881 B2
(45) Date of Patent: Oct. 13, 2026

(54) CONTAINER FOR AQUATIC LIVE BAIT

(71) Applicant: Flop Industries, LLC, Maryland Heights, MO (US)

(72) Inventors: Cody E. Stokes, Maryland Heights, MO (US); Thomas J. Dryer, Maryland Heights, MO (US)

(73) Assignee: Flop Industries, LLC, Hazelwood, MO (US)

(*) Notice: Subject to any disclaimer, the term of this patent is extended or adjusted under 35 U.S.C. 154(b) by 1372 days.

(21) Appl. No.: 17/026,615

(22) Filed: Sep. 21, 2020

(65) Prior Publication Data

US 2022/0386579 A1 Dec. 8, 2022

(51) Int. Cl.
*A01K 97/05* (2006.01)

(52) U.S. Cl.
CPC .................................... *A01K 97/05* (2013.01)

(58) Field of Classification Search
CPC ........ A01K 97/05; A01K 97/04; A01K 97/20; A01K 97/06; A01K 63/003; A01K 63/02; A01K 63/04; A01K 63/042
USPC ...................... 43/57, 56, 55, 54.1; 62/457.7; 206/315.11; 224/920; 119/201–203, 226, 119/227, 245, 248, 254, 261, 263
See application file for complete search history.

(56) References Cited

U.S. PATENT DOCUMENTS 299,765 A * 6/1884 Evans .................... A01K 97/05 43/57
668,507 A * 2/1901 Fisk ....................... A01K 97/05 43/57
668,899 A * 2/1901 Ayers ..................... A01K 97/05 43/57
750,143 A * 1/1904 Wilson et al. ......... A01K 97/05 43/57
1,435,457 A * 11/1922 Fearnow ................ A01K 63/02 119/203
1,616,125 A * 2/1927 Holman ................. A01K 63/00 43/56
1,731,921 A * 10/1929 Coleman ................ A01K 97/05 43/57
2,253,516 A * 8/1941 Haldeman ............ A01K 63/045 261/36.1

(Continued)

FOREIGN PATENT DOCUMENTS

CA 2414155 A1 * 6/2003 ............. A01K 97/05
CN 204540467 U * 8/2015

(Continued)

OTHER PUBLICATIONS

Engel 13 Quart Live Bait Drybox/Cooler—Engel Coolers (https://engelcoolers.com), Jun. 6, 2023, 12 pages.

(Continued)

*Primary Examiner* — Darren W Ark
(74) *Attorney, Agent, or Firm* — Stinson LLP

(57) ABSTRACT

A roto-molded aerated and insulated container for aquatic live bait with a seamless base into which is molded an air pump and a rechargeable battery receiver. Also molded into the base is a tubing channel interconnecting the air pump and an air stone positioned centrally in the bottom of the container. A lid hinged to the base has a gasket with air vent cut-outs sealed to a ridge formed on the rim of the base and with an ice pack attached to an underside of the lid with a strainer basket attached with straps.

32 Claims, 12 Drawing Sheets

(56) References Cited

U.S. PATENT DOCUMENTS 2,489,818 A * 11/1949 Roe ........................ A01K 97/05 116/276
2,507,444 A * 5/1950 Kear ...................... A01K 97/05 43/56
2,538,462 A * 1/1951 Klatt ...................... A01K 97/05 43/56
2,550,533 A * 4/1951 Clark ...................... A01K 97/05 261/36.1
2,552,261 A * 5/1951 Coughlin ............. A01K 63/042 91/347
2,636,308 A * 4/1953 Demmer, Sr. .......... A01K 97/05 261/123
2,644,269 A * 7/1953 Ormesher .............. A01K 97/05 43/55
2,663,115 A * 12/1953 McKissack ............ A01K 97/05 210/220
2,767,509 A * 10/1956 Breithaupt ............. A01K 97/05 43/57
2,767,510 A * 10/1956 Hopkins ................ A01K 97/05 417/63
2,772,867 A * 12/1956 Cleckner .............. A01K 63/042 43/57
2,863,255 A * 12/1958 Slipka .................... A01K 97/05 43/57
2,883,789 A * 4/1959 Schwartz ............... A01K 97/05 43/57
2,885,819 A * 5/1959 Newell .................. A01K 97/04 43/55
2,899,103 A * 8/1959 Ebert ..................... A01K 97/04 220/770
3,191,337 A * 6/1965 Fant ....................... A01K 97/05 D22/136
3,201,017 A * 8/1965 Morrissey .............. A01K 97/06 220/532
3,216,650 A * 11/1965 Thyreen ................ F04B 45/047 261/24
3,217,444 A * 11/1965 Howard ................. A01K 97/05 D22/136
3,348,330 A * 10/1967 Gilliam .................. A01K 97/05 261/122.1
3,449,855 A * 6/1969 Hassel ................... A01K 97/05 43/56
3,509,657 A * 5/1970 Bross ..................... A01K 97/05 43/57
3,553,880 A * 1/1971 Splickan et al. ....... A01K 97/20 43/55
3,831,310 A * 8/1974 Frangullie .............. A01K 97/05 43/56
3,967,869 A * 7/1976 Jackson ................. A01K 97/06 312/902
4,040,200 A * 8/1977 Tomita ................... A01K 97/05 43/57
4,208,826 A * 6/1980 Lindaman .............. A01K 97/06 206/811
4,462,180 A * 7/1984 Scott ...................... A01K 97/05 43/57
4,615,137 A * 10/1986 Radmanovich ........ A01K 97/05 43/57
4,697,380 A * 10/1987 Fenske ................... A01K 97/04 43/55
4,712,327 A * 12/1987 Ross, Sr. ................ A01K 63/02 43/57
4,757,636 A * 7/1988 Lambourn ............. A01K 97/05 43/57
5,172,511 A * 12/1992 Smith .................... A01K 97/05 43/56
5,193,301 A * 3/1993 Figgins ................ A01K 63/042 43/57
5,231,789 A * 8/1993 Radmanovich ........ A01K 97/05 43/57
5,267,410 A * 12/1993 Peyatt .................... A01K 97/05 43/57
5,305,544 A * 4/1994 Testa, Jr. ................ A01K 97/05 206/315.11
5,471,779 A * 12/1995 Downey ................ A01K 97/22 206/315.11
5,480,590 A * 1/1996 Neshat ................. A01K 63/042 210/167.26
5,634,291 A * 6/1997 Pham ..................... A01K 97/05 43/56
5,799,435 A * 9/1998 Stafford ................. A01K 97/05 43/57
5,802,760 A * 9/1998 Campbell ............. A01K 97/06 206/315.11
5,921,017 A * 7/1999 Clark ...................... A01K 97/05 43/56
5,992,086 A * 11/1999 Cheng .................... A01K 97/06 43/57
6,363,658 B1 * 4/2002 Lai ......................... A01G 27/06 47/65.5
6,367,403 B1 * 4/2002 Carter .................... A01K 97/06 114/364
6,729,066 B1 * 5/2004 Howley ................. A01K 97/06 43/56
6,755,428 B2 6/2004 Butler
6,836,998 B1 * 1/2005 Rucker .................. A01K 97/05 43/57
6,886,291 B1 * 5/2005 Jaggers .................. A01K 97/05 43/56
7,140,600 B1 * 11/2006 Wry ..................... A01K 63/042 43/57
7,389,608 B1 * 6/2008 MacKay ................ A01K 97/20 206/315.11
7,958,667 B1 * 6/2011 Pallack .................. A01K 97/05 43/56
8,387,940 B2 3/2013 Gros
8,572,889 B1 * 11/2013 Hughes ................ A01K 63/065 43/56
8,615,921 B1 * 12/2013 Weems .................. A01K 97/05 220/592.2
8,806,803 B1 * 8/2014 Mitchell ................ A01K 97/05 206/315.11
8,875,934 B2 * 11/2014 Deka .................. B65D 81/3823 220/23.88
9,220,250 B1 * 12/2015 Davis, Sr. ............. A01K 97/05
11,382,321 B1 * 7/2022 Vann, III ................ B63B 17/00
11,684,056 B1 * 6/2023 Bailey .................... A01K 97/06 43/55
12,089,570 B2 * 9/2024 Xie ........................ A01K 63/02
2004/0262319 A1 12/2004 Fisher
2006/0261111 A1 11/2006 McCoy et al.
2007/0186836 A1 * 8/2007 Tipton .................... B63B 35/14 114/255
2008/0028667 A1 * 2/2008 Grzybowski ........ A01K 63/042 43/57
2009/0064565 A1 * 3/2009 Sloop ..................... A01K 97/05 43/56
2012/0085019 A1 * 4/2012 Link ...................... A01K 97/01 43/55
2014/0014669 A1 * 1/2014 Smith ................... F25D 23/026 220/592.01
2015/0000607 A1 * 1/2015 Reid .................... A01K 63/045 119/248
2015/0377549 A1 * 12/2015 Cai ........................ A01K 97/06 43/17.5
2017/0223941 A1 * 8/2017 Cornwell ............. A01K 63/042
2019/0183099 A1 * 6/2019 Lin ....................... F04D 13/068
2020/0269894 A1 * 8/2020 Cohen ........................ B62B 3/04
2020/0345132 A1 * 11/2020 White .................... A47B 37/04
2021/0268452 A1 * 9/2021 Lee ....................... B01F 25/312
2021/0345588 A1 * 11/2021 Leach .................... A01K 97/20
2023/0110277 A1 * 4/2023 Caron .................. A22C 29/021 452/1
2023/0112280 A1 * 4/2023 Banal ...................... B62B 5/067 62/457.7
2023/0213264 A1 * 7/2023 Jacob ........................ F25D 3/06 62/457.1

(56) References Cited

U.S. PATENT DOCUMENTS

| | | | | |
|---|---|---|---|---|
| 2023/0292717 | A1* | 9/2023 | Himes | A01K 63/003 119/259 |
| 2023/0329199 | A1* | 10/2023 | Hegg | A01K 63/02 |
| 2024/0023532 | A1* | 1/2024 | Stokes | A01K 63/042 |

FOREIGN PATENT DOCUMENTS

| | | | | | |
|---|---|---|---|---|---|
| CN | 105230586 | A | | 1/2016 | |
| CN | 205320973 | U | * | 6/2016 | |
| CN | 205756686 | U | * | 12/2016 | |
| CN | 205830855 | U | * | 12/2016 | |
| CN | 205946972 | U | * | 2/2017 | |
| CN | 207505770 | U | * | 6/2018 | |
| CN | 209449510 | U | * | 10/2019 | |
| CN | 215270164 | U | * | 12/2021 | |
| CN | 216088414 | U | * | 3/2022 | |
| GB | 2450120 | A | * | 12/2008 | A01K 63/02 |
| JP | H04320635 | A | * | 11/1992 | |
| JP | H0627111 | Y2 | * | 7/1994 | |
| JP | H0742920 | U | * | 8/1995 | |
| JP | 2001148986 | A | * | 6/2001 | |
| JP | 3297030 | B2 | * | 7/2002 | |
| JP | 2002186393 | A | * | 7/2002 | |
| JP | 2004344119 | A | * | 12/2004 | |
| JP | 2007097504 | A | * | 4/2007 | |
| JP | 2007097505 | A | * | 4/2007 | |
| JP | 4553145 | B2 | * | 9/2010 | |
| JP | 2011027381 | A | * | 2/2011 | |
| JP | 3210864 | U | * | 6/2017 | |
| KR | 940005187 | Y1 | * | 8/1994 | |
| KR | 20000017198 | U | * | 9/2000 | |
| KR | 200401528 | Y1 | * | 11/2005 | |
| KR | 200420103 | Y1 | * | 6/2006 | |
| KR | 101485574 | B1 | * | 1/2015 | |
| KR | 101495268 | B1 | * | 2/2015 | |
| KR | 20200064768 | A | * | 6/2020 | |
| WO | 2013027933 | A2 | | 2/2013 | |
| WO | 2013027933 | A3 | | 4/2013 | |

OTHER PUBLICATIONS

Bait Station Bucket—Frabill (2023), 4 pages.

Bait Shack (https://whiskerseeker.com/solar-powered-bait-shack/) (2023), 8 pages.

Bait Box with Aerator—Frabill (2023), 4 pages.

Amazon.com—Frabill Bait Station Bucket—Large Aerated Live Bait 6-Gallon Storage (2023), 13 pages.

Amazon.com—Frabill Bait Box with Aerator—Live Bait Storage Cooler with Portable Aerator—8-Quart Capacity (2023), 9 pages.

Amazon.com—Engel 13qt Live Bait Cooler Box with 2nd Gen 2-Speed Portable Aerator Pump. Fishing Bait Station and Minnow Bucket for Shrimp, Minnows, and Other Live Bait—ENGLBC13-N (2023), 10 pages.

Frabill Magnum Bait Station 13 Quart Live Bait Well, Amazon.com, Nov. 20, 2023, 9 pages.

Frabill Magnum Bait Station, YouTube.com, Jun. 18, 2019, 4 pages.

Translation of WO 2013027933.

Translation of CN 105230586.

Translation of KR 101495268.

* cited by examiner

CONTAINER FOR AQUATIC LIVE BAIT

BACKGROUND OF THE INVENTION

Field of the Invention

The present invention relates to an aerated and insulated container for live bait such as minnows, shiners and shrimp with a roto-molded seamless base and lid.

Brief Description of the Prior Art

Fishermen go to great expense to obtain live aquatic bait such as minnows, shiners, shrimp and the like but the bait will die if the water in which they are kept gets too warm and if the oxygen level in the water drops too low. To be effective bait for fish, the bait must be kept alive. This is not easy if the bait must be purchased well prior to the time it is used and the weather is warm and it may not be feasible to obtain fresh bait, for example if fishing is being done in a remote area.

The drop in the oxygen level has been addressed by dangling an air tube into the bait container attached to an air pump outside the container. With this arrangement, the tube may be accidentally pulled out of the water or the user may trip. In addition, the bait may get entangled with the tube which makes it more difficult for a user to reach in and pull out bait.

But even if the oxygen level is maintained in commercially available insulated containers, the bait will still die when the water becomes too warm. What is needed is a superiorly insulated aerated container that will maintain the temperature of the water at a temperature approaching the bait's natural habitat while keeping the oxygen at an appropriate level.

BRIEF SUMMARY OF THE INVENTION

In view of the above, it is an object of the present invention to provide an insulated container capable of maintaining the water temperature in the container at an acceptable level for aquatic bait while keeping the water appropriately oxygenated.

An embodiment of the aerated and insulated container for aquatic live bait has a base and a lid with an inside and an outside. More particularly, the base is roto-molded to form a seamless structure with a sidewall with an open top and a bottom wall configured to support the container. The sidewall has a sidewall recess molded into the outside adjacent the bottom wall into which an air pump and a battery receiver for a rechargeable battery is seated. The bottom wall has a bottom channel molded into the outside with a first end aligned with a side channel opening to the sidewall recess and with a second end aligned with a center of the bottom wall. An aperture is formed in the center of the bottom wall into which an air stone is received. Tubing with a check valve is placed in the bottom channel and side channel for interconnecting the air pump with the air stone.

The subject embodiment has a lid roto-molded to form a structure having comparable insulative properties to the base and configured to cover the open top. The lid is hinged to the base at the open top with a latching device for securing the lid in closed position over the open top.

In some embodiments, the container has a substantially rectangular interior wherein the sidewall includes opposing parallel long sides and opposing parallel short sides and a rim at the top that overhangs the sidewall. In some implementations a gasket seated in a recess extending around the inside perimeter of the lid for sealing engagement with a ridge formed on the rim, said gasket having cut-outs that serve as air vents.

In some applications, the recess molded into the sidewall for the air pump and battery receiver is countersunk and the battery receiver is attached to the sidewall with suitable fasteners. In still other cases, the air stone is partially countersunk in the aperture formed in the bottom of the container.

Other instances include cut-ins in the sidewall adjacent the bottom wall for attachment to a mount structure for securing the container to the floor of a vehicle or a bottom of a boat.

In another aspect, the latching device has a latch portion attached to the lid and a keeper attached to the rim wherein the keeper includes two spaced portions forming a slot in the rim of the container for receipt of the latch portion. In a particular embodiment, the latch portion includes a grasping portion that extends at an angle from a body portion of the latch portion.

Other details in some cases include a bracket to support the air pump on an inside of the battery receiver. In still other cases a voltage converter is provided between the rechargeable battery and the air pump for example when the battery is at 20 volts and the pump operates at 4 volts.

BRIEF DESCRIPTION OF THE SEVERAL VIEWS OF THE DRAWINGS

In the accompanying drawings, in which one of various possible embodiments of the invention is illustrated, corresponding reference characters refer to corresponding parts throughout the several views of the drawings in which.

DETAILED DESCRIPTION OF AT LEAST ONE PREFERRED EMBODIMENT OF THE INVENTION

Figure 1:
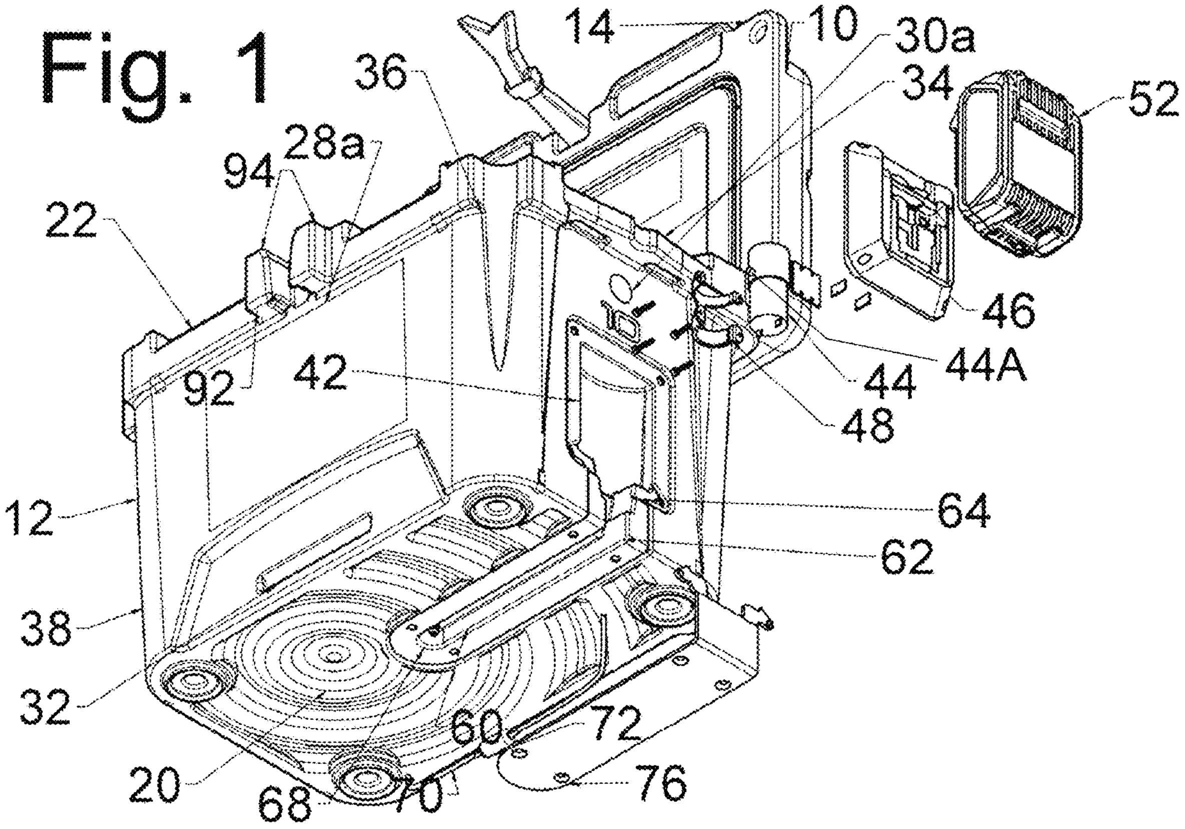
FIG. 1 is a perspective view of a container with an aeration system exploded away.
Figure 2:
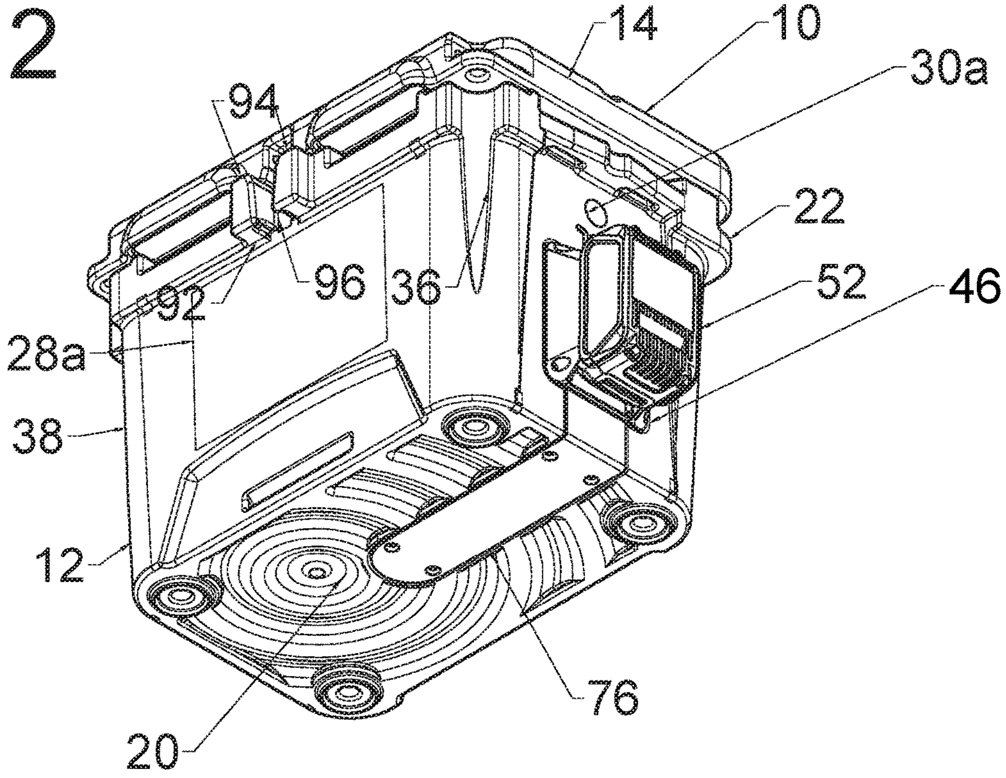
FIG. 2 is a perspective assembled view of the container.
Figure 3:
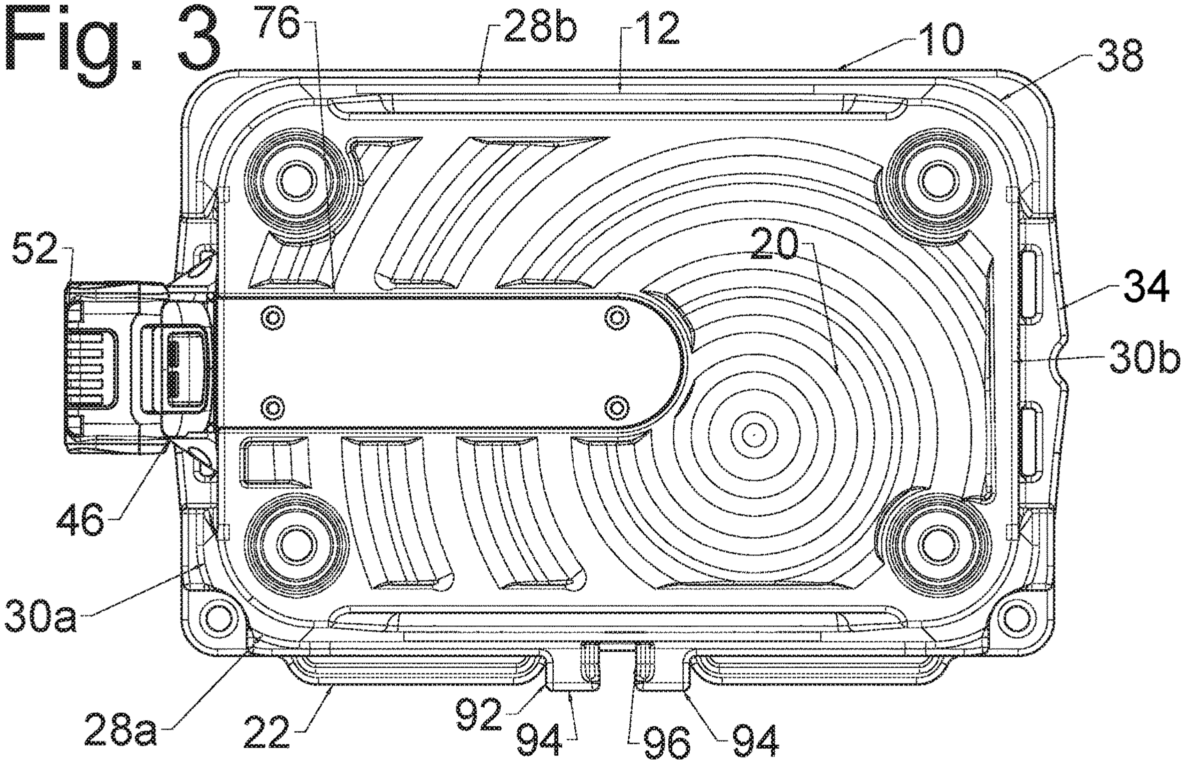
FIG. 3 is a bottom view thereof.
Figure 4:
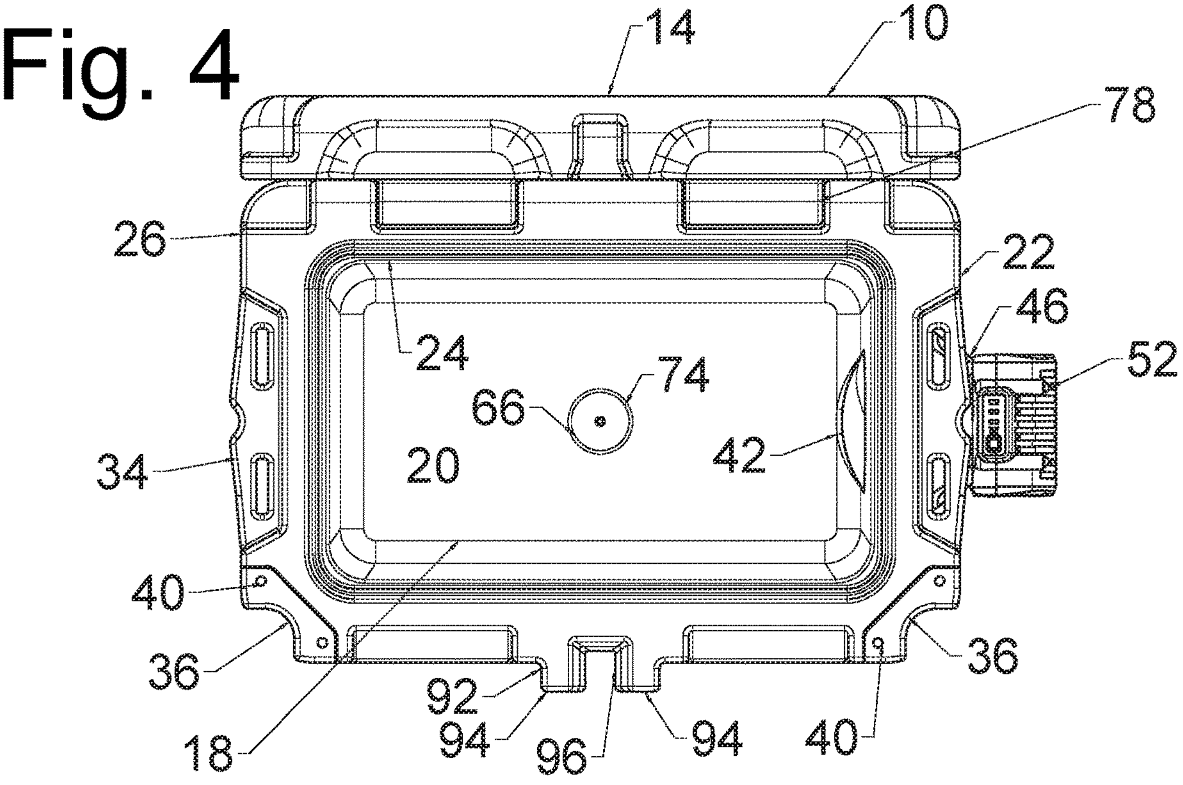
FIG. 4 is a top view thereof with a lid open.

Referring to the drawings more particularly by reference character, an aerated and insulated container 10 for aquatic live bait has a base 12 and a lid 14. Base 12 is roto-molded from a powdered thermoplastic material such as polyethylene to form a seamless structure of substantially continuous thickness and minimal imperfections. As shown in FIGS. 1-4, base 12 has a sidewall 16 with an open top 18 and a bottom wall 20 configured to support the container. Open top 18 is formed with an integral rim 22 which overhangs sidewall 16.

Base 12 is shown to have a rectangular interior with an inside 24 and an outside 26 defined by sidewall 16 and bottom wall 20 to define an open volume within the base. However other shapes may be provided by varying sidewall 16 and the connection angle with bottom wall 20. In the present embodiment, base 12 has two long sides 28*a*, 28*b* (front and rear respectively) which are parallel and two short sides 30*a*, 30*b* which are parallel to define the rectangular shape. However, long sides 28*a*, 28*b* and short sides 30*a*, 30*b* may have the same or different length. In addition container 10 is not limited to any particular volume. To facilitate carrying however, a volume of 10 to 20 qt may be preferred.

An outside 26 of long sides 28*a*, 28*b* of sidewall 16 may include cut-ins 32 adjacent bottom wall 20 to align with a mount structure (not shown) for attaching container 10 to the floor of a vehicle bed or to a boat bottom. Handles 34 are formed in rim 22 along short sides 30*a*, 30*b* such container 10 may be carried and recesses 36 may be formed at corners 38 of sidewall 16. Recesses 36 are tapered and aligned with plates 40 attached to rim 22 for use in prying off a bottle cap or the like.

Figure 10:
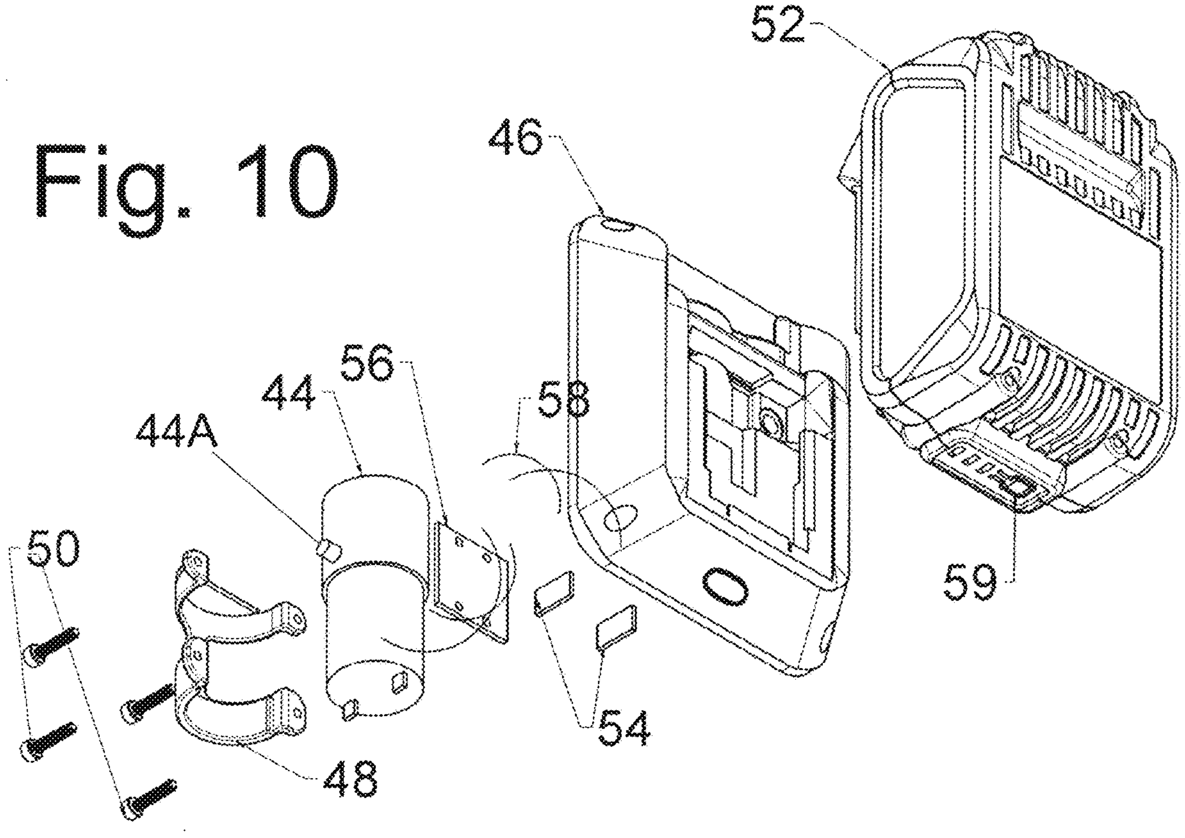
FIG. 10 is an exploded view of the rechargeable battery, battery receiver and air pump.

A sidewall countersunk recess 42 is molded in outside 26 of short side 30 a of sidewall 16 adjacent bottom wall 20. As best seen in FIG. 1 taken in combination with FIG. 10, an air pump 44 and a battery receiver 46 are seated in recess 42. The air pump 44 includes an air inlet 44A. A bracket 48 for supporting air pump 44 is attached to an inside of battery receiver 46 with suitable fasteners (not shown). In turn, battery receiver 46 is secured in countersunk recess 42 with fasteners 50. A removable and rechargeable battery 52 is coupled to an outside of battery receiver 46 and engages terminals 54 in battery receiver 46. The voltage of the rechargeable battery 52 may exceed the voltage required by air pump 44 and a voltage converter 56 may be provided for example to convert the voltage from a 20 volt battery to the voltage needed by a 4 volt motor in air pump 44. Electric wiring 58 connects air pump 44 with battery 52 through voltage converter 56 if needed. A membrane style switch 59 controls the power supply from battery 52 to the motor in air pump 44. Switch 59 may be programmed to provide a predetermined on and off duty cycle to prolong battery life.

Figure 5:
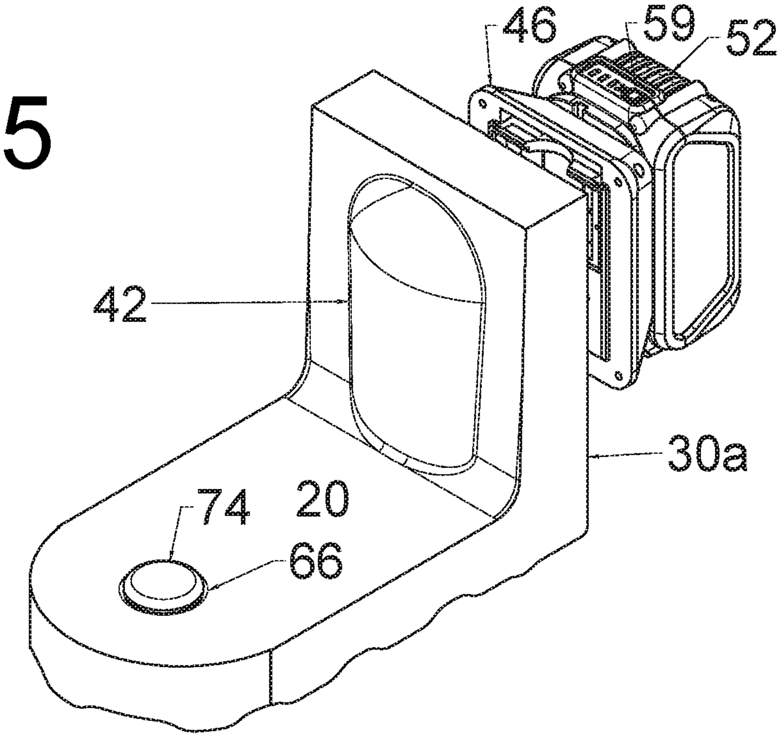
FIG. 5 is a detail showing a partially countersunk air stone connected to a rechargeable battery and battery receiver exploded from a recess molded into a sidewall of the container.
Figure 6:
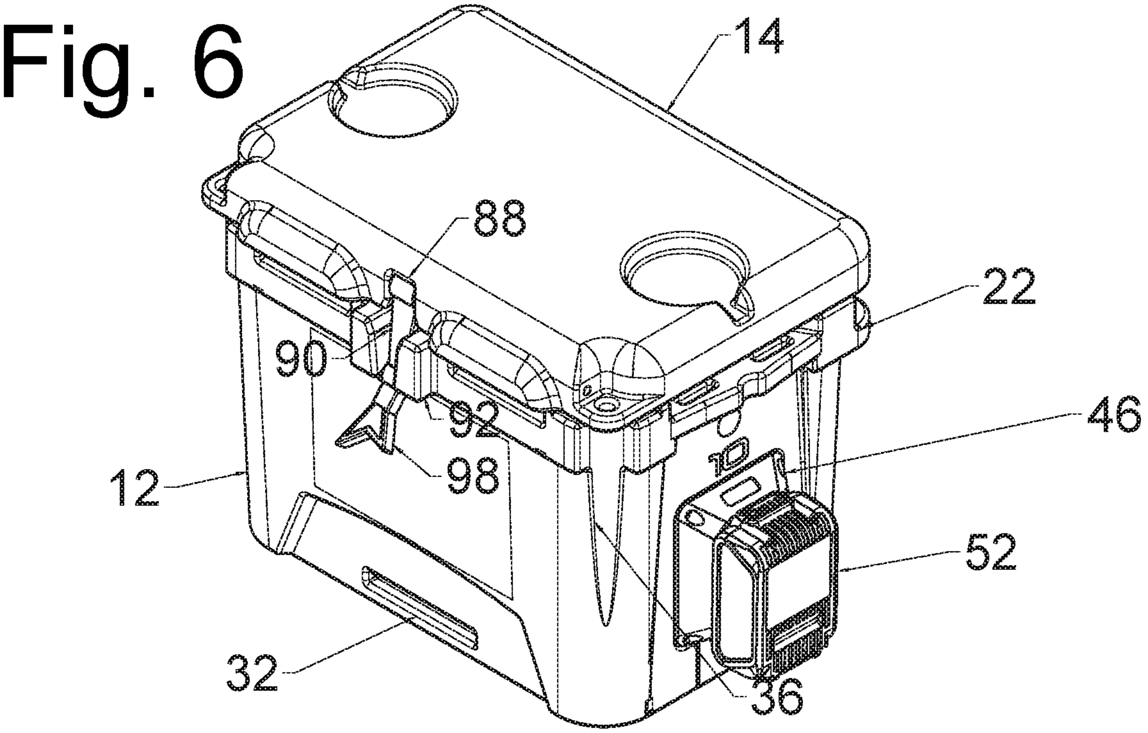
FIG. 6 is a perspective view with the lid secured with a latching device.
Figure 7:
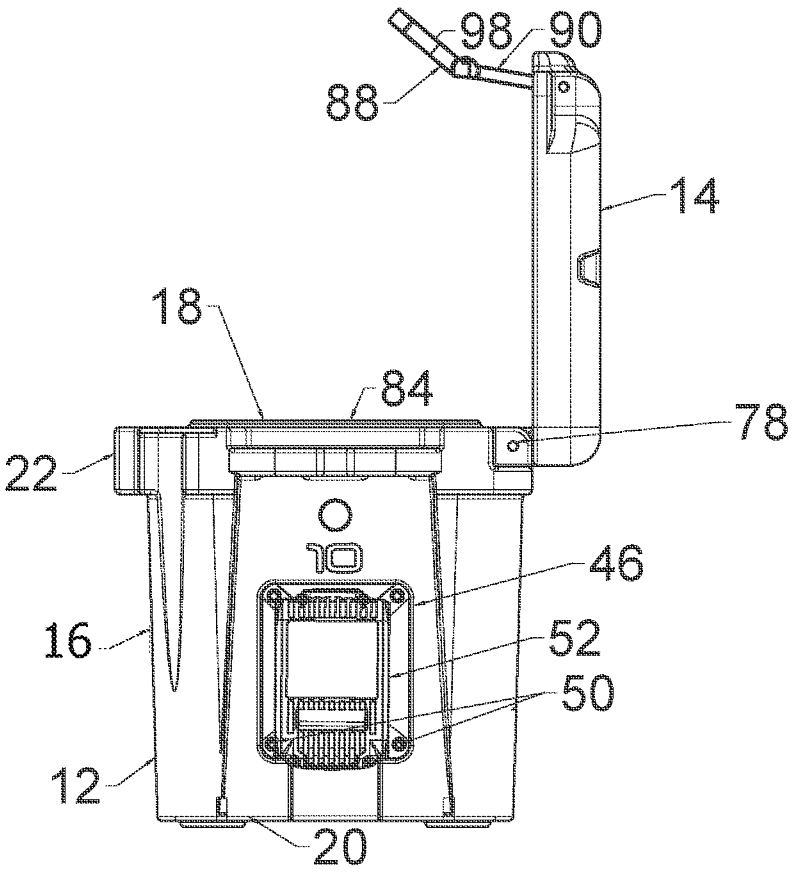
FIG. 7 is side elevation with the lid open.
Figure 8:
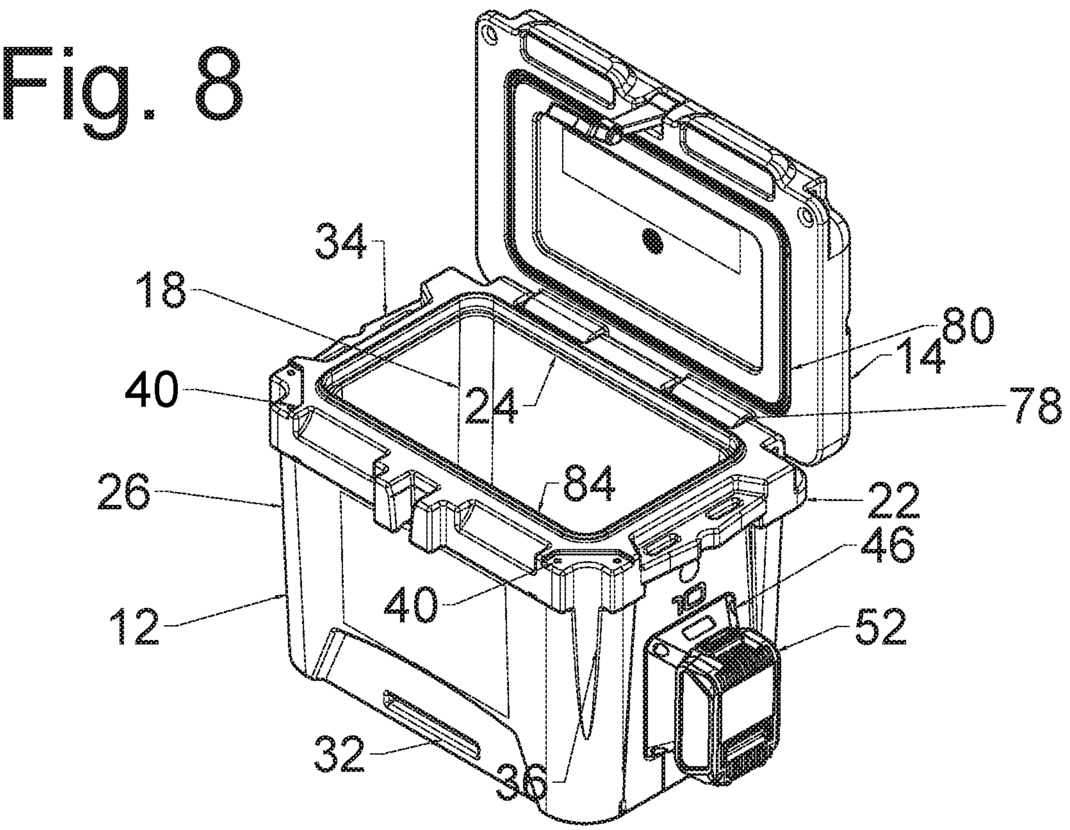
FIG. 8 is a perspective view of the container showing a gasket attached to the lid with a mating ridge on a rim of the base.

A bottom channel 60 is molded in outside 26 of bottom wall 20. A first end 62 of bottom channel 60 is aligned with a side channel 64 opening to sidewall recess 42. An aperture 66 is formed on inside 24 at the center of bottom wall 20 opening to a second end 68 of bottom channel 60. A conduit or piece of tubing 70 with a check valve 72 is received in bottom channel 60 and side channel 64 for connecting air pump 44 with an air stone 74 seated in aperture 66. As shown in FIG. 5, air stone 74 is partially countersunk into bottom wall 20 to occlude bait from getting under the air stone. An L-shaped cover 76 for bottom channel 60 and side channel 64 is attached to outside 26 of bottom wall 20 and short side 30 a of sidewall 16 with fasteners (not shown).

Lid 14 is roto-molded to form a structure with a wall thickness similar to the wall thickness of the base 12 and is configured to cover open top 18. Lid 14 is hinged 78 along rear side 28*b* on rim 22. Hinge 78 may be one of various types of hinges, including a continuous piano hinge as shown, ball joint hinge, living hinge and the like.

Figure 9:
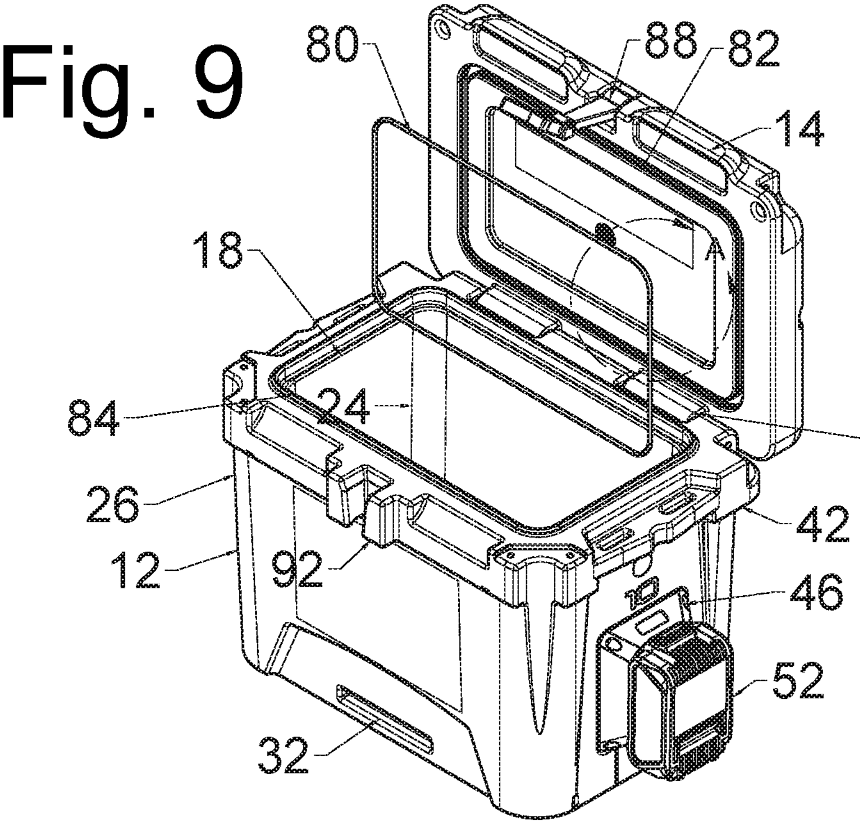
FIG. 9 is a perspective view with the gasket exploded away from the lid.
Figure 9A:
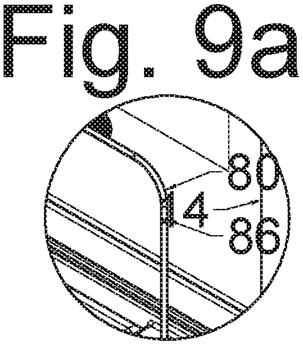
FIG. 9A is a detail taken along the line 9A-9A in FIG. 9.

Lid 14 includes a gasket 80 or other sealing device. As shown in FIGS. 9 and 9A, gasket 80 may be seated in a recess 82 extending around the perimeter of lid 14. As shown, gasket 80 has a substantially circular cross section but in other cases, gasket 80 may have other cross sections configured to aid in sealing container 10. A ridge 84 is formed around the perimeter of rim 22. Gasket 80 sides over ridge 84 to form a seal and has strategically placed cut-outs 86 that may reduce or eliminate a need for a vent. It will be understood, that the placement of gasket 80 and ridge 84 may be reversed such that recess 82 is formed in rim 22 and ridge 84 is provided on lid 14.

A latching device 88 on lid 14 to secure the lid in closed position on open top 18. Latching device 88 includes a latch portion 90 and a keeper 92. In the arrangement shown, keeper 92 includes two portions 94 that extend along either side of a latch slot 96. Latch slot 96 is configured for receipt of at least a portion of latch portion 90. In the example shown, latch portion 90 is connected to lid 14, while keeper 92 is connected to base 12. However, in some examples, latch portion 20 may be connected to base 12 while keeper 92 is connected to lid 14.

According to one aspect, latch portion 90 is made of a flexible, stretchable, resilient one-piece molded a material. In some arrangements, latch portion 90 is configured such that a grasping portion 98 extends from the body portion at an angle that departs from the body of latch portion 90. The angle between grasping portion 98 and the body of latch portion 90 may aid in or facilitate grasping latch portion 90 by a user. Grasping portion 98 may be formed into a shape that is easily grasped by a user. As shown in the drawings, grasping portion 98 is swallow tailed to facilitate grasping by a user.

Figure 11:
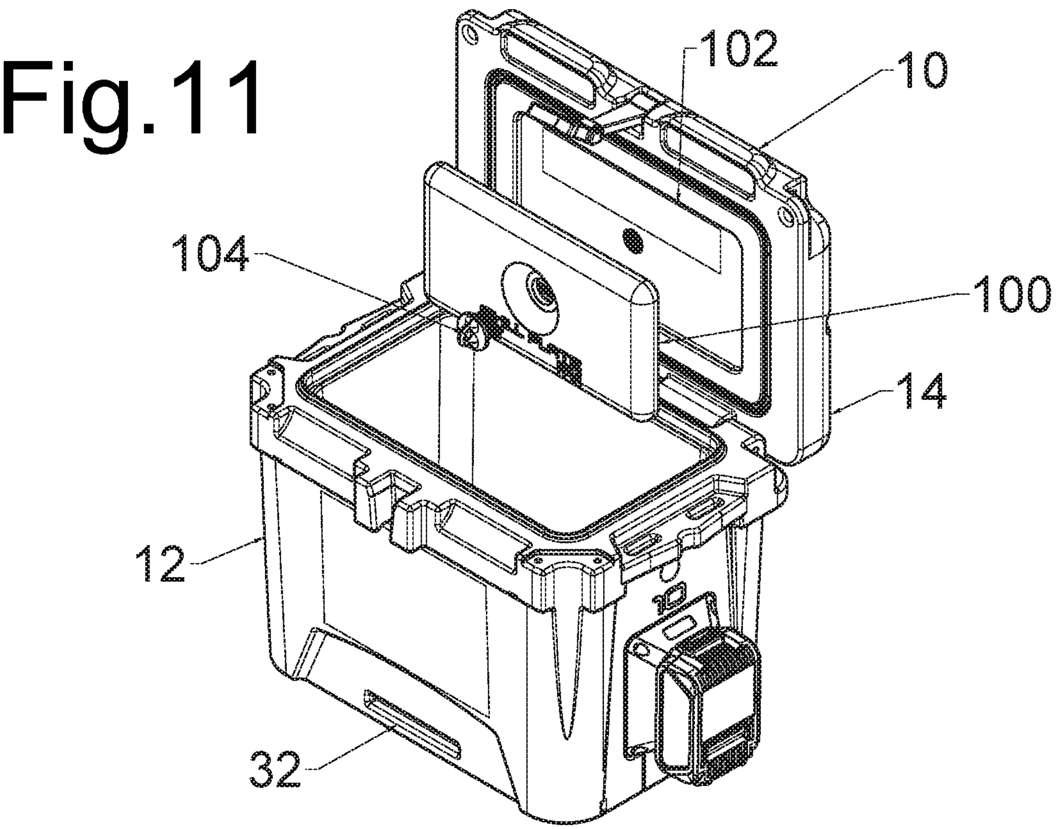
FIG. 11 is a perspective view of the container with an ice pack exploded from the lid; and, FIG. 12 is a perspective view of the container with a strainer basket that raises and lowers with the lid.
Figure 12:
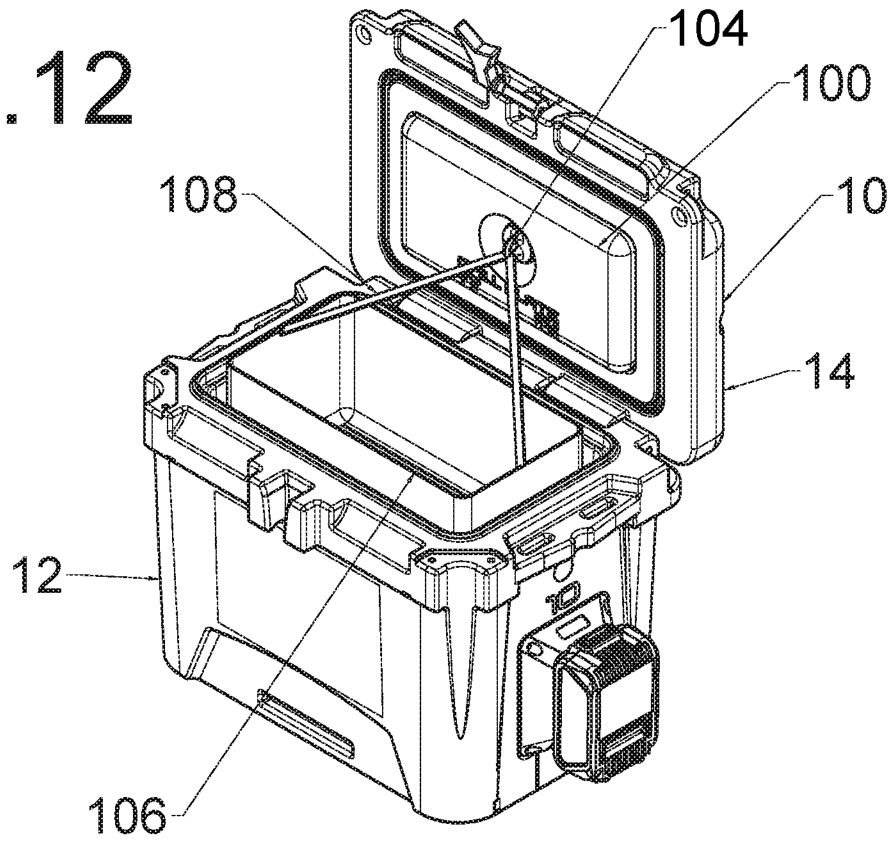

In an embodiment shown in FIGS. 11 and 12, an ice pack 100 is received in a recess 102 molded into lid 14 and held in place with a threaded screw eyelet 104. Ice pack 100 helps to maintain the temperature of the water in the container without giving the aquatic bait thermal shock when they are cast into the fishing water as does ice which is often used for other prior art containers. With continuing reference to FIGS. 11 and 12, a mesh or otherwise perforated strainer basket 106 is suspended on straps 108 attached to screw eyelet 104. Basket 106 raises and lowers as lid 14 is opened and closed. Strainer basket 106 allows a user to easily withdraw aquatic live bait as required with minimal disturbance stressing the balance.

In use, roto-molded container 10 is effective at maintaining the temperature of a volume of water in the container at a desirable temperature for an extended time. Gasket 80 and ridge 84 which form a refrigerator like seal between the lid and base of the container are also important to maintaining the temperature of the water. While container 10 also has an aeration system, keeping the water cool is essential as aeration is not enough alone. Aquatic bait such as minnows, shiners, shrimp and the like may need to be purchased long before the bait is used and it may otherwise be impossible to keep the bait alive other than for a short time.

In the aeration system, air tube 70, air pump 44 and battery receiver 46 are an integral part of container 10 and are protected from being accidental dislodged. This is big improvement over passing an air tube over the mouth of the container for attachment to an outside air pump. Cut-outs 86 in gasket allow container 10 to be vented while maintaining the refrigerator like seal between the lid and the base without having a separate vent.

The use of an air stone and the placement of air stone 74 in container 10 is also important. Air stone 74 is countersunk such that bait may not become trapped under the air stone and it is easy for a user to reach in and extract bait whereas with a loose air tube the bait gets entangled in the tubing. The air stone also does not interfere with the use of net if one is used. The placement of air stone 74 at the center of container 10 maximizes gas exchange. As small bubbles of air are released from the stone, water dissolves the oxygen and releases carbon dioxide. By increasing the surface area where the water has contact with the air, each bubble gives the water more opportunity to release carbon dioxide and take up oxygen. This improvement is shadowed by improved circulation. With air stone 74 centered at the bottom of container 10, water with more carbon dioxide and less oxygen is moved to the surface which facilitates the release of the carbon dioxide.

It is thus apparent that container 10 offers improved insulation and aeration properties. As various changes could be made in the above constructions without departing from the scope of the invention, it is intended that all matter contained in the above description or shown in the accompanying drawings shall be interpreted as illustrative and not in a limiting sense.

What is claimed:

1. An aerated and insulated container for aquatic live bait, the container comprising:

a base having an interior sized and shaped to hold water with aquatic live bait, the interior having a top opening sized and shaped to permit aquatic live bait to be inserted into and removed from the interior, the base having a sidewall and a bottom wall, the sidewall and the bottom wall bounding the interior, the bottom wall arranged to support the container, the sidewall and the bottom wall including a channel extending in and along the sidewall and in and along the bottom wall;

an aeration system including an air pump, an air diffuser, and a conduit configured to fluidly connect the air pump to the air diffuser, the air diffuser arranged to deliver air to the interior of the base, the conduit extending in the channel, the sidewall and the bottom wall arranged to enclose the conduit in the channel, the air pump configured to supply the air diffuser with air via the conduit to aerate the water in the interior, the aeration system including a receiver mounted to an exterior of the sidewall and a battery releasably supportable by the receiver, the battery configured to power the air pump; and a lid arranged to close the top opening of the interior.

2. The container of claim 1, wherein the sidewall has an exteriorly facing sidewall recess, the air pump disposed in the sidewall recess.

3. The container of claim 2, wherein the air pump is mounted to the receiver and the battery is moveable with respect to the air pump for releasably supporting the battery with the receiver.

4. The container of claim 1, wherein the aeration system includes a check valve arranged to inhibit water from the interior from reaching the air pump and to permit air to flow from the air pump toward the air diffuser, the check valve disposed in the channel, the bottom wall arranged to enclose the check valve in the channel.

5. The container of claim 4, wherein the base includes a cover forming part of the bottom wall and the sidewall, the cover enclosing the conduit and the check valve in the channel.

6. The container of claim 1, wherein the bottom wall has an aperture in communication with the interior, the air diffuser disposed in the aperture.

7. The container of claim 1, wherein the base has a cut-in adjacent to a bottom of the base configured for attachment to a mount structure for attaching the container to a vehicle or a boat.

8. The container of claim 1, further comprising a gasket arranged to be disposed between the base and the lid when the lid is in a closed position in which the lid closes the top opening of the interior, the gasket configured to form a leaky seal between the base and the lid to permit air to escape the interior when the lid is in the closed position.

9. The container of claim 1, further comprising an air vent arranged to permit air to escape the interior when the lid is in a closed position in which the lid closes the top opening of the interior.

10. The container of claim 1, further comprising:

a strainer basket sized and shaped to be inserted into the interior of the base; and an ice pack releasably connected to an underside of the lid.

11. The container of claim 1, wherein the air pump includes an air inlet in which the air pump draws air into the air pump, wherein the air inlet is disposed between the sidewall and the battery when the battery is releasably supported by the receiver.

12. The container of claim 1, wherein an entirety of the conduit is housed in the bottom wall and the sidewall.

13. The container of claim 1, wherein the conduit includes a first upstanding length segment extending in and along the sidewall and a second lateral length segment extending in and along the bottom wall.

14. The container of claim 1, wherein the bottom wall includes an upper surface bounding the interior of the base, the conduit extending in and along the bottom wall below the upper surface of the bottom wall.

15. The container of claim 1, wherein the channel includes a first channel section extending in and along the sidewall and a second channel section extending in and along the bottom wall.

16. An aerated and insulated container for aquatic live bait, the container comprising:

a base having an interior sized and shaped to hold water with aquatic live bait, the interior having a top opening sized and shaped to permit aquatic live bait to be inserted into and removed from the interior, the base having a sidewall and a bottom wall, the sidewall and the bottom wall bounding the interior, the bottom wall arranged to support the container, the sidewall having opposite first and second sidewall segments and opposite third and fourth sidewall segments interconnecting the first and second sidewall segments, the first, second, third, and fourth sidewall segments bounding the interior of the base, the first and third sidewall segments each having an exterior face, the exterior faces of the first and third sidewall segments being integrally formed with one another, the sidewall having an exteriorly facing sidewall recess, the first sidewall segment including the sidewall recess, the sidewall recess extending inward toward the interior of the base from the exterior face of the first sidewall segment, the sidewall recess being spaced apart and below a top of the sidewall;

an aeration system including a battery and pump assembly and an air diffuser, the battery and pump assembly including an air pump and a battery, the air pump being fluidly connected to the air diffuser, the air diffuser arranged to deliver air from the air pump to the interior of the base to aerate the water in the interior, the battery and pump assembly being receivable in the sidewall recess for connecting the battery and pump assembly to the base, the air pump arranged to be disposed in the sidewall recess when the battery and pump assembly is received in the sidewall recess; and a lid arranged to close the top opening of the interior;

wherein the battery and pump assembly protrudes laterally outward of the sidewall recess when the battery and pump assembly is received in the sidewall recess.

17. The container of claim 16, wherein the aeration system comprises a conduit fluidly connecting the air pump and the diffuser, and the sidewall covers the conduit.

18. The container of claim 16, wherein the aeration system comprises a conduit fluidly connecting the air pump and the diffuser, and wherein the base encloses the conduit.

19. The container of claim 16, wherein the aeration system comprises a conduit fluidly connecting the air pump and the diffuser, and wherein the base prevents the conduit from moving relative to the base.

20. The container of claim 16, wherein the aeration system comprises a conduit fluidly connecting the air pump and the diffuser, and wherein a connection between the air pump and the conduit is disposed in the sidewall recess.

21. The container of claim 16, further comprising fasteners configured to connect the battery and pump assembly to the base.

22. The container of claim 16, wherein the sidewall recess faces in a laterally outward direction relative to the interior, wherein the battery overlies the sidewall recess in the laterally outward direction when the battery and pump assembly is connected to the base.

23. The container of claim 22, wherein the air pump includes an air inlet in which the air pump draws air into the air pump, the air inlet being located laterally inward of the battery when the battery and pump assembly is connected to the base.

24. The container of claim 16, wherein the air pump includes an air inlet in which the air pump draws in air into the air pump, the air inlet being disposed in the sidewall recess when the battery and pump assembly is connected to the base.

25. The container of claim 16, wherein the battery and pump assembly has an inboard side and an outboard side, the inboard side facing the interior of the base when the battery and pump assembly is connected to the base, the air pump being located at the inboard side and the battery being located at the outboard side.

26. The container of claim 16, wherein the entire air pump is arranged to be disposed in the sidewall recess when the battery and pump assembly is received in the sidewall recess.

27. The container of claim 16, wherein the sidewall recess extends inward toward the interior of the base from the exterior face of the first sidewall segment in a first direction, wherein the sidewall recess includes an open side at the exterior face of the first sidewall segment, the open side facing in a second direction opposite the first direction.

28. The container of claim 16, wherein the sidewall recess includes an open side sized and shaped to permit the pump to move through the open side, the open side of the sidewall recess and the exterior face of the first sidewall segment facing in a same direction.

29. The container of claim 16, wherein the aeration system comprises a conduit fluidly connecting the air pump and the diffuser, and wherein the conduit is disposed entirely out of the interior.

30. The container of claim 16, wherein the aeration system comprises a conduit fluidly connecting the air pump and the diffuser, and wherein the conduit extends from the sidewall recess in a downward direction.

31. The container of claim 16, wherein the sidewall includes a downwardly facing surface bounding a top of the sidewall recess.

32. The container of claim 16, wherein the battery and pump assembly includes a receiver configured to releasably support the battery.

* * * * *